United States Patent [19]

Caruso

[11] E Patent Number: Re. 31,657

[45] Reissued Date of Patent: Sep. 4, 1984

[54] FEEDBACK MECHANISM FOR VARIABLE DISPLACEMENT HYDRAULIC DEVICE HAVING AN ELECTROHYDRAULIC CONTROLLER

[75] Inventor: John T. Caruso, Kenmore, N.Y.

[73] Assignee: Moog Inc., East Aurora, N.Y.

[21] Appl. No.: 257,791

[22] Filed: Apr. 27, 1981

Related U.S. Patent Documents

Reissue of:

[64] Patent No.: 4,248,137
Issued: Feb. 3, 1981
Appl. No.: 59,650
Filed: Jul. 23, 1979

U.S. Applications:

[63] Continuation of Ser. No. 869,829, Jan. 16, 1978, abandoned.

[51] Int. Cl.[3] ..... F15B 9/10; F01B 13/02
[52] U.S. Cl. ..... 91/375 R; 417/222
[58] Field of Search ..... 417/218, 222; 91/505, 91/375, 506; 92/12.2

[56] References Cited

U.S. PATENT DOCUMENTS

| | | | |
|---|---|---|---|
| 2,945,449 | 7/1960 | Le Febvre | 91/374 |
| 3,125,002 | 3/1964 | McCombs | 91/375 |
| 3,213,712 | 10/1965 | Swift | 74/730 |
| 3,406,608 | 10/1968 | Diedrich | 91/506 |
| 3,429,225 | 2/1969 | Keyworth | 91/506 |
| 3,463,087 | 8/1969 | Grant | 91/506 |
| 3,733,963 | 5/1973 | Kubilos | 91/506 |
| 3,750,532 | 8/1973 | Kubilos | 91/506 |
| 3,788,775 | 1/1974 | Zeutner | 417/222 |
| 3,803,987 | 4/1974 | Knapp | 91/506 |
| 3,868,889 | 3/1975 | Bobier | 91/506 |
| 3,911,792 | 10/1975 | Heyl | 91/387 |
| 4,229,144 | 10/1980 | Kass | 417/222 |

FOREIGN PATENT DOCUMENTS

| | | | |
|---|---|---|---|
| 602175 | 7/1960 | Canada | 91/387 |
| 1293027 | 4/1969 | Fed. Rep. of Germany | 91/387 |
| 812927 | 11/1954 | United Kingdom | 91/506 |

*Primary Examiner*—William L. Freeh
*Attorney, Agent, or Firm*—Sommer & Sommer

[57] ABSTRACT

Mechanical feedback through an articulated mechanism is provided between the swashplate of a variable displacement hydraulic device and the output stage of an electrohydraulic serovalve for controlling such swashplate.

14 Claims, 8 Drawing Figures

Fig. 3.
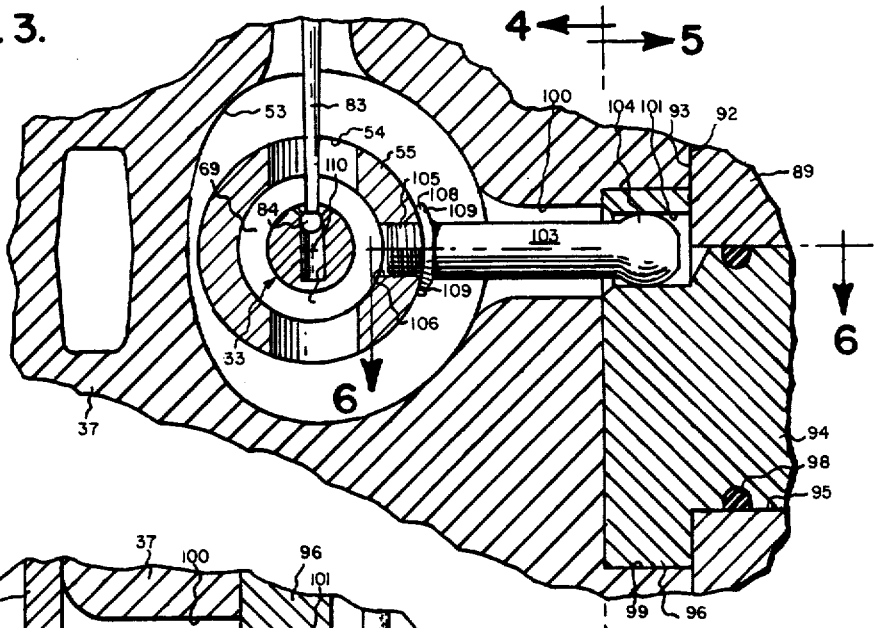
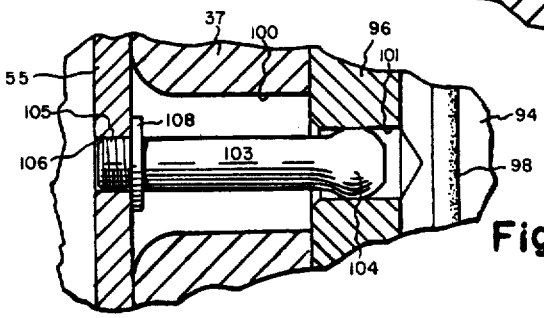
Fig. 6.
Fig. 4.
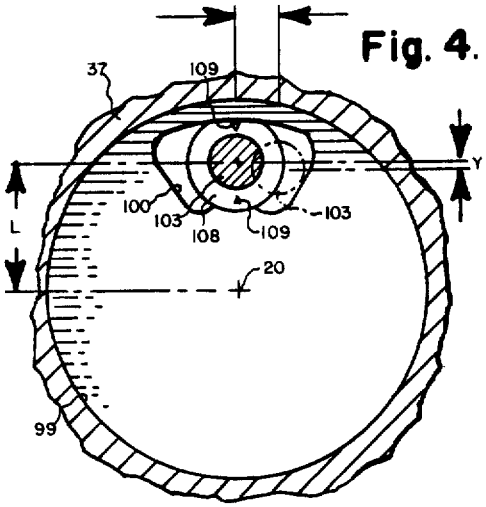
Fig 5
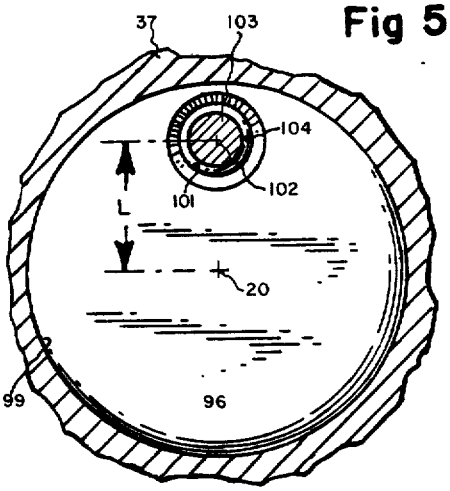

FEEDBACK MECHANISM FOR VARIABLE DISPLACEMENT HYDRAULIC DEVICE HAVING AN ELECTROHYDRAULIC CONTROLLER

Matter enclosed in heavy brackets [ ] appears in the original patent but forms no part of this reissue specification; matter printed in italics indicates the additions made by reissue.

This is a continuation of pending application Ser. No. 869,829 filed Jan. 16, 1978 now abandoned.

FIELD OF THE INVENTION

This invention relates to the field of electrohydraulic control mechanisms for variable displacement hydraulic devices as used in hydrostatic transmissions.

BACKGROUND

Variable displacement hydraulic pumps and motors are often used as a rugged, reliable and convenient way to transfer drive shaft power in a controlled manner. Such hydrostatic drives are used in construction vehicles and equipment, agricultural machinery, materials handling equipment, maritime vessels, machine tools, garden tractors and recreational vehicles.

In the usual application, a variable displacement pump is driven by a power source, such as a diesel or gasoline engine, turbine or electric motor. Flexible hydraulic lines or hoses connect the pump output to a hydraulic motor that drives the load.

In some instances in the past, pump displacement has been controlled by a manual lever throughout the range from zero to full flow in either direction. This provided an infinitely variable transmission ratio to the load, from full forward to full reverse, without the use of a clutch, mechanical gear box, or other functionally equivalent mechanism.

In such an arrangement, the hydraulic motor can be conveniently located at the load, while the pump is proximate the power source. The transmission ratio can be changed quickly by mere manipulation of the control lever, without damage to the pump or motor. Full load torque is available at stall, and optimum engine speed can be maintained at all times.

In one prior art form of hydrostatic drive, the pump was a variable displacement piston pump having a pivotal swashplate for determining the length of stroke of the pump piston. The angle of this swashplate was set by a lever manually controlled by the operator to displace a control valve for regulating flow to a control piston which positioned the angle of the swashplate and thereby regulated the desired load speed. Often a series of levers, push rods, bell cranks, or cables, were used to connect the operator's control lever to the pumps stroking mechanism.

In order to eliminate such mechanical interconnection between the operator and the hydrostatic pump, a simple potentiometer was located near the operator to selectively provide an electrical command signal for an electrohydraulic servovalve which was substituted for the former control valve. Thus, an electrohydraulic control mechanism replaced the manual lever and control valve and acted to position the swashplate in response to electrical commands. Feedback of swashplate position to the torque motor of the electrohydraulic servovalve was either mechanical as by a lever and spring operatively interposed between the swashplate and the movable armature of the torque motor, or electrical as by a potentiometer operatively interposed between the swashplate and the coils of the torque motor so that a negative feedback signal responsive to the position of the swashplate was generated to be algebraically summed with the electrical command.

SUMMARY OF THE INVENTION

The present invention provides a feedback connection between the pivotal swashplate and the output stage of the electrohydraulic servovalve, rather than its input hydraulic amplifier or torque motor stage as was done heretofore. This is achieved by providing a servovalve which has an output stage including one flow control member movable in response to angular movement of the swashplate. Preferably, this member is a metering port member, such as a ported sleeve, which is movable relative to a second output flow control member, a movable valve element, such as a valve spool, surrounded by such sleeve. This provides mechanical feedback from the pump stroking mechanism on a one-to-one follow-up basis. When there is relative displacement between the output flow control members, hydraulic fluid is ported to the pump stroking piston to cause the relative displacement to approach zero.

This inventive arrangement provides a simplified mechanical feedback mechanism between the pump swashplate and the servovalve, by effecting feedback through a single lever and eliminating the need for feedback springs.

An important object therefore is to provide a simplified mechanical feedback mechanism between a pivotal swashplate of a variable displacement hydraulic device and the output stage of an electrohydraulic servovalve controlling the flow of fluid to the stroking mechanism.

Another object is to provide such a mechanical feedback mechanism which is rugged.

A further object is to provide such a mechanical feedback mechanism which can be immersed in hydraulic fluid and therefore can be utilized with an electrohydraulic servovalve of the dry torque motor type without sacrificing the advantages thereof, by arranging the feedback mechanism on the wet side of a flexible barrier in such type of servovalve which isolates the motor on the dry side of the barrier.

Yet another object is to provide such a mechanical feedback mechanism which converts pivotal motion of the swashplate to translational movement of the metering port element while accommodating the angularity of this motion conversion.

Other objects and advantages of the present invention will be apparent from the following detailed description of a preferred embodiment illustrated in the accompanying drawings.

BRIEF DESCRIPTION OF THE DRAWINGS

FIG. 3 is a still further enlarged fragmentary view of the portion of the controller output stage and feedback mechanism within the area shown broken away in FIG. 2.

FIG. 4 is a fragmentary vertical longitudinal sectional view thereof taken generally on line 4—4 of FIG. 3, and showing the space accommodation for arcuate movement of the feedback arm carried by the metering port sleeve.

FIG. 5 is a similar fragmentary vertical sectional view transverse of the sleeve feedback arm, taken on line 5—5 of FIG. 3, and showing the eccentricity of this arm's connection to the pivotal feedback lever.

FIG. 6 is a fragmentary horizontal sectional view thereof, taken generally on line 6—6 of FIG. 3, and further illustrating the ball and recess type connection between the feedback lever and arm.

DETAILED DESCRIPTION OF THE PREFERRED EMBODIMENT

Figure 1:
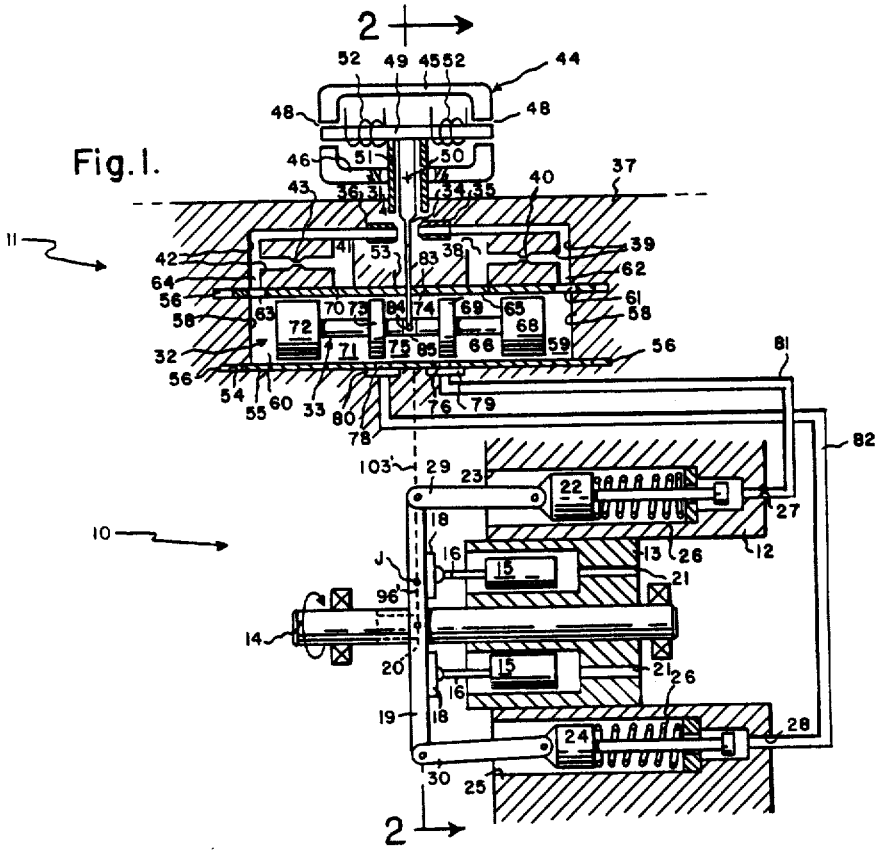
FIG. 1 is a schematic illustration of an electrohydraulic controller in association with a hydrostatic pump and embodying the improved mechanical feedback mechanism of the present invention, the position of the pump being shown for no electrical input to the controller.

It is to be understood that like reference numerals used throughout the drawings and ensuing description are intended to indicate the same elements.

The inventive mechanical feedback mechanism is shown in the drawings as operatively interposed between a variable displacement pump 10 and the output stage of an electrohydraulic controller 11. This pump and controller are illustrated schematically in FIG. 1.

Pump 10 is shown as having a stationary housing 12 surrounding a rotatable cylinder block 13 adapted to be rotated by a shaft 14 driven by any suitable prime mover or power source (not shown). The cylinder block is shown as having a pair of pump pistons 15, 15 severally arranged on opposite sides of the drive shaft, each having a rod 16 carrying a pivotal shoe 18 at its outer end. These shoes 18 bear against a swashplate 19 on opposite sides of its pivotal axis, indicated at 20, which extends transversely to the longitudinal axis of drive shaft 14. Pump output flows through output passages 21, 21 which are suitably connected to a hydraulic motor (not shown).

Means are provided for setting the angular position of swashplate 19 about its axis 20. As shown, such means include a control piston 22 in a cylinder 23 provided in pump housing 12 on one side of axis 20, and a similar control piston 24 in a cylinder 25 provided in the pump housing on the other side of axis 20. Each piston 22, 24 has a return spring 26. Cylinders 23 and 25 are served hydraulical by ports 27 and 28, respectively. A link 29 connects piston 22 to the upper part of the swashplate above its pivotal axis 20, and a similar link 30 connects piston 24 to the lower part of the swashplate below this axis.

By controlling differentially the flow of hydraulic fluid through ports 27 and 28, control pistons 22 and 24 can be positioned in their respective cylinders to set the angle of swashplate 19 and thereby control the length of stroke pump pistons 15 will have, to regulate the flow through pump ports 21. Such a pump stroking mechanism, including the pump itself, is well understood by those skilled in the art.

Electrohydraulic controller 11 is shown as an electrohydraulic flow control servovalve having a hydraulic amplifier 31 of the double nozzle-flapper type, and as also having an output stage 32 including a rectilinearly-movable valve spool 33, with mechanical feedback between this spool and flapper. Such a mechanical feedback flow control servovalve is more fully illustrated and described in U.S. Pat. No. 3,023,782 the disclosure of which is herein incorporated by cross-reference.

Suffice it to say here, that hydraulic amplifier 31 includes a flapper 34, and a pair of stationary nozzles shown as right and left nozzles 35 and 36, respectively. Pressurized fluid is supplied to these nozzles upstream of their discharge openings from a suitable source (not shown) external of valve body 37, via a first supply passage 38 connected by branch passage 39 having a restrictor 40 therein to right nozzle 35, and via a second supply passage 41 connected by branch passage 42 having a restrictor 43 therein to left nozzle 36.

The servovalve 11 is also shown as having a torque motor 44 including upper and lower pole pieces 45 and 46, respectively, separated to provide air gaps 48 in which the opposite ends of a horizontal armature 49 are arranged. These pole pieces are associated with permanent magnets (not shown) so as to polarize them. This armature is centrally fixed to vertically disposed flapper 34 to provide a rigid T-shaped member which is supported on a frictionless pivot having an axis indicated at 50, provided by a flexure tube 51 which surrounds the flapper in spaced relation thereto. The lower end of flexure tube 51 is suitably sealingly secured to valve body 37 and the upper end of this tube is suitably sealingly secured to the armature-flapper member. Each arm of armature 49 is shown as surrounded by a coil 52 so that when energized through a suitable circuit (not shown), well understood by those skilled in the art, an electromagnetically induced flux can be produced in the air gaps 48 to attract armature 49 closer to one than the other of the portions of the pole pieces at each air gap and thus pivot the armature-flapper member about axis 50. The tip of flapper 34 is movably arranged between nozzles 35, 36 which discharge hydraulic fluid thereagainst to be collected in a sump chamber represented at 53 connected to a drain port (not shown) in valve body 37.

Differential movement of the flapper relative to the nozzles produces a differential pressure in branch passages 39, 42 upstream of the discharge openings of these nozzles. This differential pressure is applied to the ends of valve spool 33 to control its rectilinear movement. For this purpose, valve body 37 is shown as internally formed to provide a cylinder 54 in which a sleeve member 55 is slidably and rotatably arranged. Each end of cylinder 54 is provided with an annular recess 56 to accommodate the corresponding end of sleeve 55. Each recess provides a stem 58 which projects into the corresponding end of the sleeve. The opposing and spaced end faces of these stems and valve spool provide a right spool end chamber 59 and a left spool end chamber 60. Right chamber 59 constantly communicates with branch passage 39 leading to right nozzle 35 through an opening 61 in sleeve 55 and a passage 62 in the valve body. Similarly, on the left side, left chamber 60 constantly communicates with branch passage 42 leading to left nozzle 36 through an opening 63 in sleeve 55 and a passage 64 in the valve body.

Sleeve 55 is shown as having a right supply port 65, on its outside constantly communicating with right supply passage 38, and on its inside constantly communicating with the annular space 66 between a right outer lobe 68 and a right inner lobe 69 on valve spool 33. The sleeve also has a left supply port 70, on its outside constantly communicating with left supply passage 41, and on its inside constantly communicating with the annular space 71 between a left outer lobe 72 and left inner lobe 73 on the valve spool. Between ports 65, 70 is a drain port 4, on its outside constantly communicating with sump 53, and on its inside constantly communicating with the annular space 75 between axially spaced inner lobes 69, 73.

Sleeve 55 is also shown as having a right metering port 76 proximate right inner lobe 69, and a left metering port 78 proximate left inner lobe 73. These metering ports constantly communicate with right and left actuating ports 79 and 80, respectively, in valve body 37. A conduit 81 is shown as constantly communicating right actuating port 76 with upper stroking cylinder port 27, and a conduit 82 is shown as constantly communicating left actuating port 78 with lower stroking cylinder port 28.

In order to provide mechanical feedback between the valve spool 33 and flapper 34, a feedback spring wire 83 at one end is cantilever-mounted on the tip of the flapper, and at its other end is constrained to move substantially frictionlessly with the valve spool. For this, the lower end of wire 83 carries a spherical ball 84 which rollingly engages the walls of a groove 85 provided in the stem of the valve spool between its inner lobes 69, 73.

The axial distance between the bottoms of annular recesses 56, 56 is greater than the axial length of sleeve 55 so that this sleeve never bottoms out during its full range of axial movement. These recesses are suitably connected to drain, in a manner not illustrated but well understood by those skilled in the art, to carry away any fluid leaked past the ends of the sleeve.

The inner lobes 69, 73 of valve spool 33 are shown, as is preferred, underlapped to drain and overlapped to pressure. The underlap, in conjunction with the control piston return springs 26, gives a positive neutral deadzone.

In accordance with the present invention, mechanical feedback means are operatively interposed between swashplate 19 and output stage 32 of electrohydraulic controller 11. Such means are shown in FIGS. 2–6.

Figure 2:
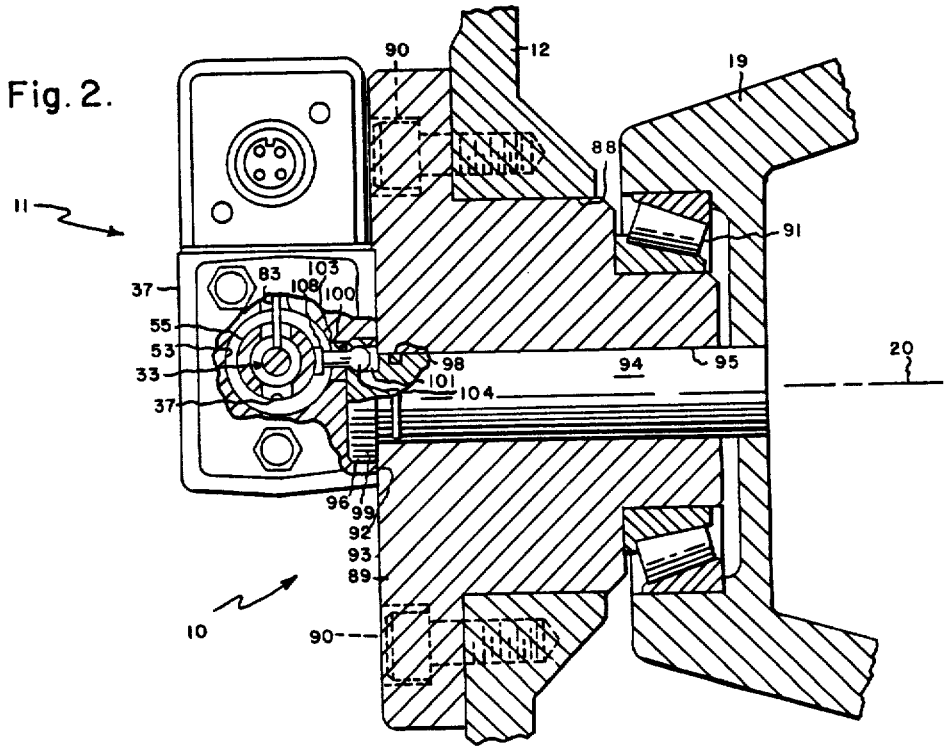
FIG. 2 is an enlarged fragmentary transverse vertical sectional view thereof taken generally on line 2—2 of FIG. 1, and showing a trunnion for the swashplate illustrated fragmentarily and in section, and also showing the electrohydraulic controller mounted proximate such trunnion and illustrated principally in elevation but with portions broken away to reveal the elements of the inventive mechanical feedback mechanism operatively interposed between the swashplate and output stage of the controller.

Referring to FIG. 2, the pump housing 12 on one side is shown as having an opening 88 closed by a trunnion member 89 secured to the housing as by a plurality of machine screws 90. At its inner end, which projects inwardly of the housing wall, trunnion member 89 supports a tapered roller bearing 91, on which one side of swashplate 19 is mounted. The other side of this swashplate is similarly mounted on a trunnion member (not shown) so that the swashplate is pivotal about horizontal transverse axis 20.

The valve body 37 of controller 11 has a vertical flat inner side face 92 which engages the vertical flat outer surface 93 of trunnion member 89. Suitable fasteners (not shown) secure this valve body to the trunnion member.

A horizontal feedback shaft 94 is suitably fixedly connected to swashplate 19 and extends laterally therefrom, concentric with axis 20, through a bore 95 in trunnion member 89. At surface 93, shaft 94 is shown as provided with an enlarged, flat-sided, cylindrical, integral head 96. Slightly inwardly of the shoulder of this head, shaft 94 has an annular groove in which an O-ring 98 is arranged to sealingly engage the wall of bore 95.

As best shown in FIG. 3, valve body face 92 has a cylindrical recess 99 to accommodate shaft head 96, which is rotatable in such recess. The valve body 37 is shown as having an access opening 100 which extends from the base of recess 99 to sump chamber 53, this opening being horizontal as viewed in FIG. 3 and eccentric with respect to axis 20. Substantially in line with opening 100, a horizontal cylindrical recess 101 is provided, partly in the body of feedback shaft 94 and partly in its head 96. Its axis, represented at 102 in FIG. 5, is offset vertically above feedback shaft axis 20 a distance L FIG. 5 which represents a lever arm.

Sleeve 55 is shown as having a rigid feedback arm 103 projecting radially outwardly therefrom, and horizontally as shown in FIG. 3. The outer end of this arm has a slightly enlarged spherically-surfaced head 104 having a diameter corresponding to that of recess 101 and arranged therein and engaging the wall thereof. The inner end of arm 103 is shown at 105 as being externally threaded and screwed into an internally threaded hole 106 in sleeve 55. This arm also has an integral collar 108 at the inner end of the threaded section 105, which, when assembled to the sleeve, is preferably staked at two places indicated at 109, 109 to prevent rotation of the arm relative to the sleeve.

As seen in cross-section in FIG. 4, access opening 100 is preferably arcuate in shape to accommodate circumferential tipping of the sleeve 55 about its longitudinal axis 110 (FIG. 3) when the sleeve is displaced along this axis. The vertical displacement of feedback arm 103 in the plane of FIG. 4, due to such tipping of the arm causing rotation of sleeve 55, is represented by FIG. 5. This corresponds to a horizontal displacement X of the sleeve along its axis 110.

During such vertical and horizontal displacements Y and X, respectively, spherically-surfaced head 104 must have a rolling engagement with the cylindrical wall of recess 101, both circumferentially and axially of this recess. This is referred to herein as a ball and recess means connecting the feedback arm 103 and feedback lever 96.

Figure 7:
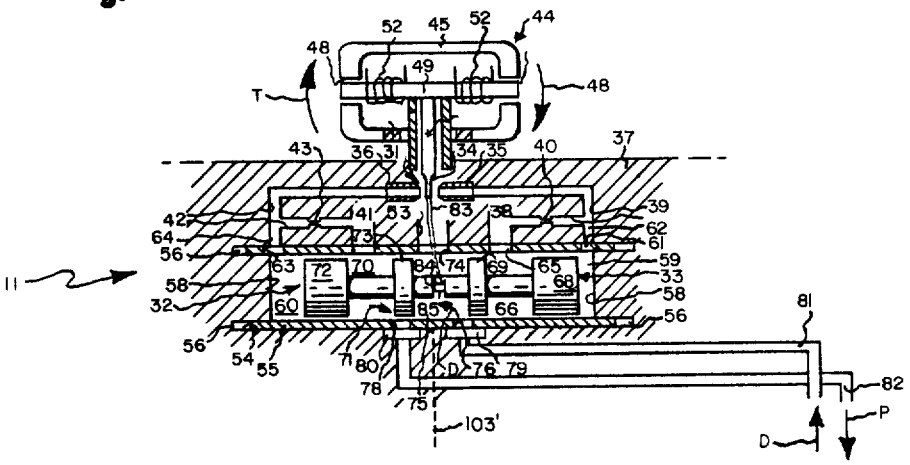
FIG. 7 is a schematic illustration of the electrohydraulic controller shown in the upper portion of FIG. 1, and depicting the displacement of the valve spool relative to the metering port sleeve which takes place initially upon an electrical input to the controller to effect a fluid drive of the stroking mechanism before the swashplate is displaced from its position shown in FIG. 1.
Figure 8:
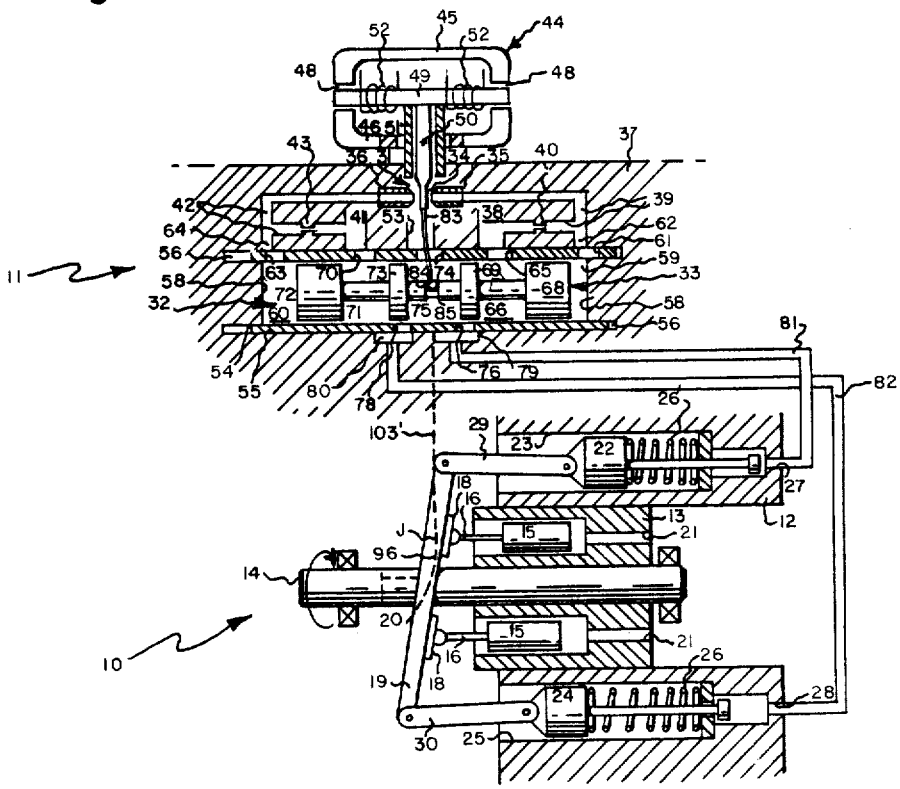
FIG. 8 is a schematic illustration of the apparatus shown in FIG. 1, but depicting the condition of the output stage of the controller after final displacement of the swashplate in response to the effect of an electrical input to the controller as depicted in FIG. 7.

Referring to the schematics of FIGS. 1, 7 and 8, feedback lever 96 is represented by broken line 96', feedback arm 103 by broken line 103', and the ball and recess means connecting them by a dot J representing this joint.

OPERATION

In explaining the operation, it is assumed that the various parts initially are in the condition depicted in FIG. 1.

Let it now be assumed that there is an input to the controller in the form of an electrical current to the coils 52 of torque motor 44. The direction and magnitude of this current is such that it produces a torque on the T-shaped armature-flapper member 49, 34 so as to pivot this member in a clockwise direction about pivotal axis 50 as viewed in FIG. 7, this direction being depicted by the arrows T. Such pivotal movement brings the tip of flapper 34 initially hard over against the outlet of left nozzle 36, while this tip moves farther away from right nozzle 35. This diverts fluid flow into left spool end chamber 60, while further opening the connection of right spool end chamber 59 to drain. The effect is to produce a differential pressure on valve spool 33, hydraulically driving it to the right. As this spool so moves, it drags the lower end of feedback spring 83, causing this spring to bend, and pulls the flapper tip away from the left nozzle. The spool will continue to displace rightwardly, and the deflection of the feedback spring will increase, until the force exerted thereby on the flapper produces a torque which counterbalances the electrically induced torque produced by the current input to the torque motor. When this occurs, the flapper tip will be returned to a position between the nozzles such that essentially no differential pressure then exists between the spool end chambers. Actually, a small but finite differential pressure is necessary to hold the spool in a displaced position. The drive force on the spool so ceasing, it stops and remains in a displaced position (FIG. 7) to the right of its null or centered position (FIG. 1). Thus, spool displacement is proportional to the magnitude of torque unbalance on the armature-flapper member, which is related to the direction and magnitude of current input to the servovalve.

When spool 33 displaces rightwardly relative to valve sleeve 55, as depicted in FIG. 7, left inner lobe 73 uncovers more of left metering port 78 and right inner lobe 69 uncovers more of right metering port 76. This opening of left port 78 establishes communication between left annular space 71, which is under supply pressure, with left actuating port 80 and associated conduit 82. The direction of fluid flow is represented by the arrows P. The enlarged communication between right metering port 76 and central annular space 75 allows fluid to flow from conduit 81 through right actuating port 79, through port 76 and into space 75 to drain. Such fluid flow to drain is represented by the arrows D.

In FIG. 7, it is assumed that no follow-up feedback movement of valve sleeve 55 has yet occurred so that the position of this sleeve relative to the valve body 37 is the same as depicted in FIG. 1. In other words, schematic feedback arm 103' is in the same position relative to the valve body in both FIGS. 1 and 7.

Turning now to FIG. 8, the servovalve controller is in the same condition as depicted in FIG. 7 except that sleeve 54 has been shifted rightwardly to return to a nulled or centered position relative to the rightwardly displaced valve spool 33. This comes about as a result of the change in angular position of swashplate 19 effected by fluid flow through conduits 81, 82, as will now be explained.

When flow through ports 76, 78 and conduits 81, 82 in the direction of arrows P, D is occurring, conduit 82 carries a higher pressure to pump housing port 28 than conduit 81 connected to pump housing port 27 which is connected to drain. This drives lower control piston 24 to the left pushing link 30 and the lower end of swashplate 19 leftwardly, while the upper end of this swashplate pushes link 29 and control piston 22 to the right. The result is that swashplate 19 has been pivoted in a clockwise direction about its axis 20, as viewed in FIG. 8, thus changing its angularity and establishing a stroke for pump pistons 15. This stroke is adjustable, and hence the output of the pump in ports 21, by so varying the angular position of the swashplate.

As swashplate 19 changes its position from that shown in FIG. 1 to that shown in FIG. 8, feedback lever 96' has also moved in a clockwise direction about pivotal axis 20 to shift joint J rightwardly. This joint is connected by rigid arm 103' to valve sleeve 54. The effect is to move this valve sleeve rightwardly to a final position shown in FIG. 8 in which the metering ports 76, 78 are again disposed in their normal underlapped and overlapped condition with respect to the two inner valve spool lobes 69, 73. During the course of follow-up movement of valve sleeve 54 relative to the displaced valve spool 73, this sleeve both shifts longitudinally, represented by X in FIG. 4, and tips rotatively, represented by Y in FIG. 4. In reality, these actual distances X and Y are very minute.

The articulated feedback mechanical connection 96', J, 103' between swashplate 19 and valve sleeve 54 produces a one-to-one follow-up of this sleeve relative to the swashplate.

A change in current input to the torque motor will produce a proportionate change in valve spool position, in turn producing a change in position of the pump stroke mechanism pistons thereby changing the angularity of the swashplate about its pivotal axis. The feedback lever moves through the same angle as the swashplate and by its articulated connection with the feedback arm slaves the metering port sleeve to the valve spool.

While the operation of the electrohydraulic controller has been described for a current input having a direction operative to effect an initial clockwise pivotal motion of the armature-flapper member and a consequent rightward displacement of the valve spool, it will be appreciated that the same sort of action takes place in opposite directions if the current direction is reversed so that conduit 81 becomes the high pressure line and conduit 82 becomes the low pressure line leading to drain.

From the foregoing, it will be seen that the embodiment illustrated and described herein accomplishes the various stated objectives of the invention.

The embodiment illustrated is the best mode contemplated at the time of filing this application for carrying out the invention. Variations and modifications of the structure illustrated will readily occur to those skilled in the art without departing from the spirit of the invention.

For example, the ball and recess joint 104, 101 may be reversed on the feedback arm 103 so that the recess is in the sleeve 55 with the ball 104 on the end of the arm adjacent this sleeve, and the other end of this arm is rigidly connected to the feedback lever 96. This will provide articulation at the sleeve, rather than at the lever, as illustrated.

As a further example of a contemplated modification, the two mechanical feedbacks associated with the two relatively movable members 33, 55 of the output stage 32 of the servovalve could be reversed. Thus, any suitable two-stage electrohydraulic servovalve having a torque motor with an armature, a first stage hydraulic amplifier, and a second stage spool and sleeve, could be arranged so that the mechanical feedback to the armature is used to create a position of the sleeve, instead of the spool as shown, proportional to the electrical input, and the second mechanical feedback is used to position the spool, instead of the sleeve as shown, proportional to swashplate position. More specifically, in such a modification, the hydraulic amplifier could be arranged to drive the sleeve, a feedback spring wire similar to wire 83 could connect the sleeve 55 to the armature 49 of the torque motor, and the articulated feedback, provided by lever 96 and arm 103, could be operatively interposed between the spool 33 and the swashplate.

Accordingly, the invention is to be measured by the scope of the appended claims and not limited to the embodiment illustrated.

What is claimed is:

1. In hydraulic apparatus having a pivotal load, having a fluid-operated mechanism for adjusting the pivotal position of said load, and also having a controller including an output stage having a movable spool member and a movable sleeve member arranged such that the relative positions of said members controls the flow of hydraulic fluid with respect to said mechanism, the improvement which comprises:

mechanical feedback means interposed between said load and one of said members and operative to produce axial and rotative movement of said member in response to pivotal movement of said load, whereby pivotal movement of said load will cause follow-up movement of said one member to null said one member on the other of said members.

2. The improvement as set forth in claim 1 wherein said apparatus further comprises a variable-displacement hydraulic device having a pivotal swashplate, the angled position of which controls the hydraulic performance of said device, and wherein said load is said swashplate.

3. The improvement as set forth in claim 1 wherein said mechanical feedback means includes a single joint between said load and said one member.

4. The improvement as set forth in claim 3 wherein said single joint includes a substantially spherically-surfaced ball mounted for movement with one of said one member and load, and a substantially cylindrical recess mounted for movement with the other of said one member and load, and wherein said ball is arranged in said recess.

5. The improvement as set forth in claim 3 wherein said mechanical feedback means includes a lever mounted fast to said load for movement therewith and having a free end portion, and an arm mounted fast to said one member for movement therewith and having a free end portion, and wherein said single joint is provided between said lever and arm free end portions.

6. The improvement as set forth in claim 5 wherein said single joint includes a substantially spherically-surfaced ball provided on one of said free end portions, a substantially cylindrical recess provided in the other of said free end portions, and wherein said ball is arranged in said recess.

7. In hydraulic apparatus *having a casing*, having a pivotal load *arranged within said casing*, having a fluid-operated mechanism *arranged within said casing* for adjusting the pivotal position of said load, and also having a controller *arranged without said casing, said controller* including an output stage having a movable spool member and a movable sleeve member arranged such that the relative positions of said members controls the flow of hydraulic fluid with respect to said mechanism, the improvement which comprises:

mechanical feedback means interposed between said load and one of said members and operative to produce [followup] *follow-up* movement of said one member in response to pivotal movement of said load, said mechanical feedback means [including] *providing* a single joint between said load and said one member *and including a shaft having one end connected to said load for rotative movement therewith, having an intermediate portion sealingly penetrating said casing, and having its other end arranged without said casing, and including an arm having one end connected to said one member and having its other end at a location eccentric from the axis of said shaft.*

8. The improvement as set forth in claim 7 wherein said apparatus further includes a variable-displacement hydraulic device having a pivotal swashplate, the angled position of which controls the hydraulic performance of said device, and wherein said load is said swashplate.

9. The improvement as set forth in claim 7 wherein said single joint includes ball and recess means.

10. The improvement as set forth in claim 9 wherein said ball and recess means includes a substantially spherically-surfaced ball mounted for movement with one of said one member and load, and a substantially cylindrical recess mounted for movement with the other of said one member and load, and wherein said ball is arranged in said recess.

11. The improvement as set forth in claim 10 wherein said mechanical feedback means includes a lever mounted fast to said load for movement therewith and having a free end portion, and wherein said recess is provided in said lever free end portion.

*12. The improvement as set forth in claim 7 wherein said arm one end is mounted fast to said one member.*

*13. The improvement as set forth in claim 7 wherein said single joint is provided between said shaft and said arm other end.*

*14. The improvement as set forth in claim 13 wherein said single joint includes ball and recess means.*

* * * * *